(12) United States Patent
Suzuki

(10) Patent No.: US 6,696,140 B2
(45) Date of Patent: *Feb. 24, 2004

(54) ANTI-GLARE FILM AND PROCESS FOR PRODUCING SAME THEREOF

(75) Inventor: Hiroko Suzuki, Shinjukju-Ku (JP)

(73) Assignee: Dai Nippon Printing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/576,241

(22) Filed: May 24, 2000

(65) Prior Publication Data

US 2002/0150722 A1 Oct. 17, 2002

(30) Foreign Application Priority Data

May 28, 1999 (JP) ............................................. 11-149017

(51) Int. Cl.$^7$ ............................... B32B 7/02; B32B 5/16
(52) U.S. Cl. ....................... 428/212; 428/323; 428/327; 428/334
(58) Field of Search ................................. 428/323, 332, 428/213, 212, 327, 334

(56) References Cited

U.S. PATENT DOCUMENTS

| 5,618,872 A | * | 4/1997 | Pohl et al. | .................. | 524/430 |
| 5,886,819 A | * | 3/1999 | Murata et al. | .............. | 359/483 |
| 6,074,741 A | * | 6/2000 | Murata et al. | .............. | 428/327 |

* cited by examiner

Primary Examiner—Paul Thibodeau
Assistant Examiner—Kevin Kruer
(74) Attorney, Agent, or Firm—Parkhurst & Wendel, L.L.P.

(57) ABSTRACT

Disclosed are an antiglare film having a high level of anti-scintillation properties, high sharpness of transmitted images, high light transmittance (total light transmittance), and a high level of external light reflection preventive properties, and a process for producing the antiglare film. A resin and non-agglomerative particles having a specific particle diameter are selected so that the difference in refractive index between the resin and the particles is 0.05 to 0.15. The resin and the non-agglomerative particles are brought to a coating composition using, as a solvent, a good solvent for the resin and a poor solvent for the resin. The coating composition is coated onto a substrate film to form a coating which is then dried. In the course of the drying, as the amount of the good solvent in the coating decreases, the poor solvent acts to cause the gelation of the particles and the resin. Thus, good concaves and convexes can be advantageously formed on the surface of the coating. The layer thus formed can meet various property requirements for antiglare films.

4 Claims, 1 Drawing Sheet

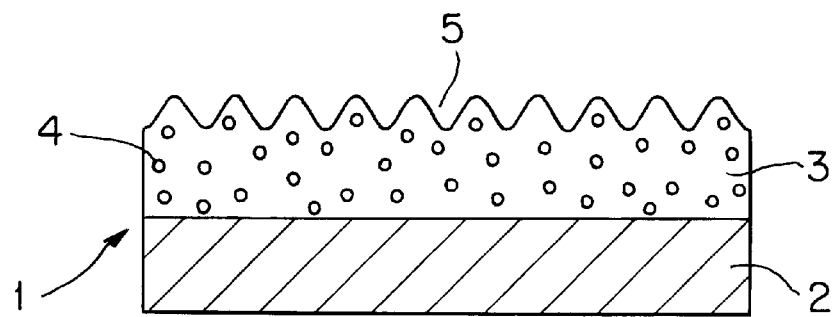
F I G. 1

ANTI-GLARE FILM AND PROCESS FOR PRODUCING SAME THEREOF

TECHNICAL FIELD

This invention relates to an antiglare film which, when disposed on the front of CRTs (cathode ray tubes) displays or liquid crystal displays, serves to diffuse light externally incident on these displays, thereby reducing glare.

BACKGROUND ART

In CRT displays, accelerated electrons collide with phosphors located on the inner side of the front glass to impart energy to the phosphors. This permits the phosphors to emit light, and, in general, red, green, and blue lights outgo on the front side. In liquid crystal displays, the liquid crystal per se does not emit light. Since, however, light is applied from the backside to enhance the visibility of liquid crystal images, on the whole of the display, light is emitted toward the front.

When the display is used in a room, light from lighting equipment, such as a fluorescent lamp, enters the surface of the display and is reflected from the display surface. This causes glaring of the display screen or reflection of a fluorescent lamp on the display screen, making it difficult to perceive letters and the like displayed on the screen.

The disposition of an antiglare film, having a light diffusing layer formed by coating a silica-containing resin coating composition onto a transparent substrate film, on the front of the display to diffuse external light causative of glare, and consequently to alleviate the glare of the display screen, has been already carried out in the art.

Conventional antiglare films include one wherein concaves and convexes have been formed on the surface of a light diffusing layer through the agglomeration of particles of agglomerative silica or the like, one wherein resin beads having a larger particle diameter than the thickness of the coating have been added to impart concaves and convexes on the surface of the coating, and one wherein an embossing film having concaves and convexes on its surface had been laminated onto the surface of an unsolidified coating to transfer the shape of concaves and convexes onto the surface of the coating followed by the separation of the embossing film.

All the above conventional antiglare films have light diffusing properties, a certain level of antiglare effect, and, in addition, by virtue of the thin film form, can be easily applied to displays.

However, when light emitted from the display toward the front is passed, through the antiglare film, shining called "scintillation" occurs on the film surface, disadvantageously posing a problem of deteriorated visibility of displayed images.

The following properties are important for an antiglare film which, in use, is disposed on the front of a display: (1) high level of anti-scintillation properties; (2) high image sharpness; (3) high light transmittance (=total light transmittance); and (4) high antiglare properties derived from light diffusing properties (=high level of capability of preventing the reflection of external light from a fluorescent lamp or the like external light reflection preventive properties)). None of the conventional antiglare films simultaneously satisfy all the above property requirements.

DISCLOSURE OF THE INVENTION

Accordingly, it is an object of the present invention to provide an antiglare film simultaneously satisfy all of the property requirements, that is, (1) high anti-scintillation properties, (2) high sharpness of transmitted images, (3) high total light transmittance, and (4) high external light reflection preventive properties without significantly altering the form of the conventional antiglare film, that is, the thin film form, and a process for producing the same.

The present inventors have found that, in the formation of an antiglare film by coating of a resin coating composition with particles dispersed therein, the formation of good concaves and convexes and the provision of an antiglare film satisfying various properties required of light diffusing films can be realized by a method which comprises the steps of: selecting a resin and non-agglomerative particles having a specific article diameter so that the difference in refractive index between the resin and the particles is 0.05 to 0.15; bringing the resin and the non-agglomerative particles to a coating composition using, as a solvent, a good solvent for the resin and a poor solvent for the resin; coating the coating composition onto a substrate film to form a coating; and drying the coating, whereby, in the course of the drying, as the amount of the good solvent contained in the coating decreases, the poor solvent acts to cause the gelation of the particles and the resin.

According to one aspect of the present invention, there is provided an antiglare film comprising at least a light diffusing resin layer formed of non-agglomerative light-transparent fine particles dispersed in a light-transparent resin, the light-transparent fine particles having a particle diameter of 1.0 to 5.0 μm, the difference in optical refractive index between the light-transparent fine particles and the light-transparent resin being 0.05 to 0.15, the content of the light-transparent fine particles being 5 to 30 parts by weight based on 100 parts by weight of the light-transparent resin, the surface roughness of the light diffusing resin layer being 0.12 to 0.30 in terms of center line average roughness (Ra) and 1.0 to 2.9 in terms of ten-point average roughness (Rz).

In another embodiment of the antiglare film according to the present invention, the light diffusing resin layer is stacked on a transparent substrate.

According to the present invention, the thickness of the light diffusing resin layer is preferably 1 to 3 times the diameter of the light-transparent fine particles.

According to the present invention, the antiglare film preferably has an image sharpness of 80 to 300 and a level of external light reflection preventive properties of 5 to 70.

According to another preferred embodiment of the present invention, the light-transparent resin is a cured product of an ionizing radiation-curable resin.

According to another aspect of the present invention, there is provided a process for producing an antiglare film, comprising the steps of:

providing a coating composition comprising non-agglomerative light-transparent fine particles, a light-transparent resin, a good solvent for the light-transparent resin, and a poor solvent for the light-transparent resin, the light-transparent fine particles having a particle diameter of 1.0 to 5.0 μm, the difference in optical refractive index between the light-transparent fine particles and the light-transparent resin being 0.05 to 0.15, said ingredients being contained in the coating composition in an amount of 5 to 30 parts by weight for the light-transparent fine particles based on 100 parts by weight of the light-transparent resin and in an amount of 20 to 1,000 parts by weight for the solvent in terms of the total amount of the good solvent and the poor solvent, the parts by weight ratio of the good solvent to the poor solvent being 100:20 to 100:70;

coating the coating composition onto a substrate; and then drying the coating to reduce the weight ratio of the good solvent to the light-transparent resin, whereby, while allowing the light-transparent fine particles and the light-transparent resin to gel, the coating is solidified to create concaves and convexes on the surface of the coating.

According to a preferred embodiment of the present invention, the light-transparent resin and the good and poor solvents are selected from the following combinations:

(a) a combination of an acrylate resin, a good solvent for the acrylate resin selected from the group consisting of toluene, methyl ethyl ketone, ethyl acetate, n-butyl acetate, and cyclohexanone, and a poor solvent for the acrylate resin selected from the group consisting of methanol, ethanol, n-butanol, and isopropanol;

(b) a combination of a cellulosic resin, a good solvent for the cellulosic resin selected from the group consisting of ethyl acetate, n-butyl acetate, acetone, and cyclohexanone, and a poor solvent for the cellulosic resin selected from the group consisting of methanol, ethanol, n-butanol, and isopropanol;

(c) a combination of an epoxy resin, a good solvent for the epoxy resin selected from the group consisting of methanol/toluene ("/" referring to mixing), ethanol/xylene, methyl ethyl ketone, ethyl acetate, n-butyl acetate, and methyl isobutyl ketone, and a poor solvent for the epoxy resin selected from the group consisting of toluene, xylene, cyclohexanone, and cyclopentane;

(d) a combination of a urea melamine resin, a good solvent for the urea melamine resin selected from the group consisting of ethyl acetate, n-butyl acetate, n-butanol, and n-hexyl alcohol, and a poor solvent for the urea melamine resin selected from the group consisting of toluene and xylene; and (e) a combination of a urethane resin, a good solvent for the urethane resin selected from the group consisting of ethyl acetate, n-butyl acetate, and methyl ethyl ketone, and a poor solvent for the urethane resin selected from the group consisting of methanol and ethanol.

In the above process, the drying is preferably carried out at a temperature of 20 to 100° C.

According to another embodiment of the process, the light-transparent resin is an ionizing radiation-curable resin and, after the formation of concaves and convexes on the surface of the coating, an ionizing radiation is applied to the coating to cure the coating through crosslinking.

BRIEF DESCRIPTION OF THE DRAWING

FIG. 1 is a cross-sectional view of the antiglare film according to the present invention.

BEST MODE FOR CARRYING OUT THE INVENTION

The embodiments of the present invention will be described with reference to FIG. 1. An antiglare film 1 according to the present invention basically has a laminate structure comprising a transparent substrate 2 and a light diffusing resin layer 3 stacked on the transparent substrate 2. The light diffusing resin layer 3 internally contains light-transparent fine particles 4 and has fine concaves and convexes 5 on its surface.

In the formation of the light diffusing resin layer to by coating, the transparent substrate 2 is an object to be coated with the light diffusing resin layer 3 and thus is in most cases necessary. Alternatively, a casting method may be used which comprises providing a releasable substrate instead of the transparent substrate 2, coating a light diffusing resin layer 3 on the surface of the releasable substrate, and then separating the releasable substrate from the light diffusing resin layer 3. According to the casting method, self-supporting light diffusing resin layer 3 not provided with the transparent substrate 2 can be obtained.

Materials for constituting the antiglare film according to the present invention, the mixing ratio of the materials, the surface roughness of the antiglare film, solvents (good solvent and poor solvent) used in the production of the antiglare film according to the present invention, drying and the like will be successively described.

The non-agglomerative light-transparent fine particles constituting the antiglare film according to the present invention have an optical refractive index very close to the light-transparent resin which will be described next, and, thus, when dispersed in the light-transparent resin, are transparent. The diameter of the light-transparent fine particles is preferably in the range of 1.0 to 5.0 $\mu$m. When the particle diameter is less than 1.0, the addition of the light-transparent fine particles to the light-transparent resin does not provide satisfactory light diffusing properties. On the other hand, when the particle diameter exceeds 5.0 $\mu$m, the image sharpness and the light transmittance are unsatisfactory.

Specific examples of non-agglomerative light-transparent fine particles usable herein include organic non-agglomerative light-transparent fine particles, such as styrene beads (refractive index 1.60), melamine beads (refractive index 1.57), acryl beads (refractive index 1.49), acryl-styrene beads (refractive index 1.54), polycarbonate beads, polyethylene beads, and polyvinyl chloride beads. Among them, styrene beads and acryl-styrene beads are preferred.

Among the non-agglomerative light-transparent fine particles, inorganic non-agglomerative light-transparent fine particles usable herein include fine particle of $SiO_2$ (refractive index 1.5 to 2.0), $Al—SiO_2$ (refractive index 1.65), and $GeO_2$ (refractive index 1.65). Among them, fine particles of $SiO_2$ are preferred.

Since all the above light-transparent fine particles are non-agglomerative, the difference in refractive index between the light-transparent fine particles and the light-transparent resin can effectively offer internal scattering properties, and thus can prevent scintillation.

Light-transparent resins include a crosslinking-cured product of an ionizing radiation-curable resin, a cured product prepared by crosslinking of an ionizing radiation-curable resin together with a solvent evaporation type resin, particularly thermoplastic resin, and a cured product of a thermosetting resin.

Among them, resins belonging to the category of ionizing radiation-curable resins are mainly acrylate oligomers or prepolymers, or monofunctional or polyfunctional monomers. Oligomers or prepolymers include relatively low-molecular weight polyester resin, polyether resin, acrylic resin, epoxy resin, urethane resin alkyd resin, spiroacetal resin, polybutadiene resin and polythiol-polyene resin and acrylate or methacrylate (acrylate and methacrylate being hereinafter collectively referred to as "(meth)acrylate") of polyhydric alcohols or the like.

These ionizing radiation-curable resins may contain the following monofunctional monomers or polyfunctional monomers as a reactive diluent. Monofunctional monomers include ethyl (meth)acrylate, ethylhexyl (meth)acrylate, styrene, methylstyrene, and N-pyrrolidone, and polyfunctional monomers include trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate. These monofunctional monomers or polyfunctional monomers may be cured as such by crosslinking without the oligomer or the prepolymer, or alternatively may be used as a mixture thereof with a thermoplastic resin or a thermosetting resin.

Preferred solvent evaporation type resins, which may be added to the ionizing radiation-curable resin, are mainly cellulosic resins because of high transparency, and examples thereof include nitrocellulose resin, acetylcellulose resin, cellulose acetate propionate resin, and ethylhydroxyethylcellulose resin.

Thermosetting resins usable as the light-transparent resin include phenolic resins, urea resins, diallyl phthalate resins, melamine resins, guanamine resins, unsaturated polyester resins, polyurethane resins, epoxy resins, aminoalkyd resins, urea-melamine resins, and silicone resins.

When the thermosetting resin is used, if necessary, for example, a crosslinking agent or a polymerization initiator may be added.

In the antiglare film according to the present invention, the difference in optical refractive index between the light-transparent fine particles and the light transparent resin should be 0.05 to 0.15. Regarding the refractive index of the light-transparent resin, the ionizing radiation-curable resin has a refractive index of about 1.5. In the case of other resins, when the optical refractive index is low, the refractive index difference is sometimes larger than the acceptable refractive index difference. This sometimes results in lowered transparency of the light-transparent fine particles. In this case, fine particles having high optical refractive index, for example, fine particles of $TiO_2$ (refractive index 2.3 to 2.7), $Y_2O_3$ (refractive index 1.87) $La_2O$ (refractive index 1.95), $ZrO_2$ (refractive index 2.05), or $Al_2O_3$ (refractive index 1.63) may be added to the light-transparent resin to enhance the refractive index of the light-transparent resin, thereby regulating the difference in refractive index between the light-transparent resin and the light-transparent fine particles.

The non-agglomerative light-transparent fine particles are added in an amount of 5 to 30 parts by weight based on 100 parts by weight of the light-transparent resin. When the amount of the non-agglomerative light-transparent fine particles added is less than 5 parts by weight, satisfactory light diffusing properties cannot be provided. Therefore, the anti-scintillation properties and the external light reflection preventive properties of the antiglare film are unsatisfactory. When the amount of the non-agglomerative light-transparent fine particles added exceeds 30 parts by weight, the light-diffusing properties can be improved. In this case, however, the haze is increased resulting in lowered sharpness of transmitted images, and, in addition, the light transmittance (=total light transmittance) is unfavorably lowered.

The antiglare film according to the present invention preferably has the following specified surface roughness. Specifically, the center line average roughness (Ra) is 0.12 to 0.30, and the ten-point average roughness (Rz) is 1.0 to 2.9. The center line average roughness (Ra) and the ten-point average roughness (Rz) may be determined according to the methods specified in JIS B 0601.

Here the center line average roughness (Ra) is 0.12 to 0.30, and the ten-point average roughness (Rz) is 1.0 to 2.9.

In the antiglare film according to the present invention, the thickness of the light diffusing resin layer is preferably 1 to 3 times the diameter of the light-transparent fine particles internally dispersed in the light diffusing resin layer. The antiglare film according to the present invention is produced by the process of the present invention, described below, using a good solvent and a poor solvent, and concaves and convexes are formed on the surface of the coating through a mechanism of drying in the course of the production process. Therefore, even though the layer thickness clearly exceeds the diameter of the fine particles to such an extent that the fine particles are internally embedded in the light diffusing resin layer, the antiglare film can have the surface roughness specified above.

When the thickness of the light diffusing resin layer is smaller than the diameter of the light-transparent fine particles internally dispersed in the light diffusing resin layer, the concaves and convexes formed on the layer surface are large, leading to deteriorated anti-scintillation properties. On the other hand, when the thickness of the light diffusing resin layer is more than 3 times the diameter of the light-transparent fine particles, increasing the amount of the fine particles added is necessary for forming concaves and convexes having good shape on the surface of the layer. This increases the haze and consequently lowers the sharpness of transmitted images and the total light transmittance.

According to the antiglare film of the present invention, specifying the particle diameter of the light-transparent fine particles, the difference in refractive index between the light-transparent fine particles and the light-transparent resin, the mixing ratio between the light-transparent fine particles and the light-transparent resin, and the surface roughness can provide excellent properties of the antiglare film, that is, a level of sharpness of transmitted images of 80 to 300 and a level of external light reflection preventive properties of 5 to 70.

The sharpness (distinctness) of a transmitted image is determined according to JIS K 7105. Specifically, light transmitted through or reflected by a sample is measured through a moving optical comb by using a measuring apparatus for the sharpness of an image, and the sharpness of the transmitted image is calculated from the results by the following equation:

$$C=(M-m)/(M+m)\times 100$$

wherein

C represents sharpness of transmitted image, %;

M represents maximum wave height; and m represents minimum wave height.

The larger the value of the sharpness C (%) of the transmitted image, the higher the sharpness of the image and the better the quality of the image. The apparatus used is an image clarity measuring apparatus (ICM-1DP) manufactured by Suga Test Instruments Co., Ltd. In the optical comb, four slit widths are used. Therefore, the maximum value is 100%×4=400%.

The level of the external light reflection preventive properties may be measured as follows. A black pressure-sensitive adhesive tape is applied to a light diffusing resin layer on its side not having concaves and convexes as a sample to prevent the reflection of light from the backside. While this sample is kept horizontal, a parallel light flux having a size of 5 mm square is applied to the sample at an angle of 10 degrees to the normal thereof. The light flux reflected on the light diffusing resin layer in its side having concaves and convexes is observed from the regular reflection direction by means of a CCD camera. The aperture of the CCD camera is regulated to bring the luminance of the peak to a given value, and the inclination angle of the luminance at the inflection point of the luminance in the edge portion of the reflected light flux. This inclination angle is regarded as the level of external light reflection preventive properties. When a light flux is reflected on a specular surface, the inclination of the luminance is substantially equal to 90 degrees. In the case of a matte surface having large concaves and convexes, the inclination of the luminance is smaller.

The "external light reflection" in the item of evaluation of antiglare films prepared in examples and comparative examples described below refers to the level of external light reflection preventive properties determined in this way.

In the production of the antiglare film according to the present invention, non-agglomerative light-transparent fine particles are mixed with a light-transparent resin, the mixture is dispersed or dissolved in a solvent composed of a good solvent for the light-transparent resin and a poor solvent for the light-transparent resin to prepare a coating composition, and the coating composition is coated onto a substrate to form a coating which is then dried to cure the coating.

In the coating composition, the solvent (the good solvent and the poor solvent being collectively referred to as "solvent") is used in an amount of 20 to 1,000 parts by weight based on 100 parts by weight of the light-transparent resin. In this case, the parts by weight ratio of the good solvent to the poor solvent in the solvent is 100:20 to 100:70.

The term "good solvent" refers to a solvent having an excellent capability of dissolving or swelling the resin, and the term "poor solvent" refers to a solvent which has a poor capability of dissolving the resin and is likely to, cause the gelation of the resin. In this connection, the following matter should be noted. Both a suitable good solvent and a suitable poor solvent vary depending upon each resin as the solute. Further, probably, whether the solubility is excellent or poor is relatively determined. Examples of combinations of typical light-transparent resins with good and poor solvents for the light-transparent resins include:

a) a combination of an acrylate resin, a good solvent for the acrylate resin selected from the group consisting of toluene, methyl ethyl ketone, ethyl acetate, n-butyl acetate, and cyclohexanone, and a poor solvent for the acrylate resin selected from the group consisting of methanol, ethanol, n-butanol, and isopropanol;

b) a combination of a cellulosic resin, a good solvent for the cellulosic resin selected from the group consisting of ethyl acetate, n-butyl acetate, acetone, and cyclohexanone, and a poor solvent for the cellulosic resin selected from the group consisting of methanol, ethanol, n-butanol, and isopropanol;

c) a Combination of an epoxy resin, a good solvent for the epoxy resin selected from the group consisting of methanol/toluene ("/" referring to mixing), ethanol/xylene, methyl ethyl ketone, ethyl acetate, n-butyl acetate, and methyl isobutyl ketone, and a poor solvent for the epoxy resin selected from the group consisting of toluene, xylene, cyclohexanone, and cyclopentane;

d) a combination of a urea melamine resin, a good solvent for the urea melamine resin selected from the group consisting of ethyl acetate, n-butyl acetate, n-butanol, and n-hexyl alcohol, and a poor solvent for the urea melamine resin selected from the group consisting of toluene and xylene; and e) a combination of a urethane resin, a good solvent for the urethane resin selected from the group consisting of ethyl acetate, n-butyl acetate, and methyl ethyl ketone, and a poor solvent for the urethane resin selected from the group consisting of methanol and ethanol.

In the above combinations, two or more good solvents and/or two or more poor solvents may be used for the light-transparent resin.

In the coating composition, the amount of the solvent is 20 to 1,000 parts by weight based on 100 parts by weight of the light-transparent resin. When the resin or monomer used has high solubility, the amount of the solvent may be small. On the other hand, when the resin or monomer used has relatively low solubility or, upon dissolution in the solvent, forms a highly viscous solution, the amount of the solvent used is increased.

When the amount of the solvent used is below the lower limit of the specified amount range, upon the evaporation of only a small amount of the solvent, the viscosity is increased or otherwise gelation occurs. This is a source of trouble in the production of the antiglare film. On the other hand, when the amount of the solvent used is above the upper limit of the specified amount range, much energy is required for the evaporation of the solvent to dry the coating.

The parts by weight ratio of the good solvent to the poor solvent in the solvent is 100:20 to 100:70.

A coating composition, wherein the amount of the poor solvent used is below the lower limit of the specified amount range, is disadvantageous in that, since the major proportion of the solvent is accounted for by the good solvent, upon coating of the coating composition, the whole solvent rapidly disappears making is difficult for concaves and convexes to be formed on the surface of the coating by mere drying. On the other hand, when the poor solvent is contained in an amount larger than the upper limit of the specified amount range, gelation proceeds in an early stage. This is likely to result in the formation of large concaves and convexes. Further, in this case, there is a fear of the coating composition causing gelation during storage, and, in addition, when the evaporation rate of the poor solvent is slow, there is a possibility that the coating is less likely to be dried.

The relative evaporation rate R of the solvent may be used as a measure of evaporation rate of the solvent. The relative evaporation rate R of the solvent A is determined using, as a standard, the time required for n-butyl acetate to be evaporated at room temperature, and calculated by the equation R=[time required for n-butyl acetate to be evaporated]/[time required for solvent A to be evaporated]. The larger the value of R, the higher the evaporation rate, and the smaller the value of R, the lower the evaporation rate.

Preferably, the relative evaporation rate R is not more than 3.7 for the good solvent, and not more than 1.9 for the poor solvent. The good solvent and the poor solvent arch preferably selected so that the relative evaporation rate R of the good solvent is higher than that of the poor solvent. Since, however, the good solvent and the poor solvent should also be selected by taking into consideration the parts by weight ratio of the good solvent to the poor solvent and the capacity of a dryer for drying after coating of the coating composition, the relative evaporation rate R of the good solvent selected is in some cases lower than that of the poor solvent.

When the coating composition satisfies a requirement such that the amount of the solvent (the good solvent and the poor solvent being collectively referred to as "solvent") is 20 to 1,000 parts by weight based on 100 parts by weight of the light-transparent resin and the parts by weight ratio of the good solvent to the poor solvent in the solvent is 100:20 to 100:70, this coating composition is free from gelation during storage and other problems, and can maintain a viscosity suitable for coating.

Materials for the substrate to be coated with the coating composition in the formation of the light diffusing resin layer include transparent glass and transparent resins. The transparent resin may be in the form of a film, a sheet, or a plate.

An example of transparent resin is a resin wherein hydroxyl groups of cellulose have been partially or entirely esterified mainly with a lower fatty acid. Specific examples of such resins include acetylcellulose and cellulose acetate butyrate, typically cellulose triacetate. Further, various polyesters (typically polyethylene terephthalate=PET), acryl (typically polymethyl methacrylate), polyurethane, polycarbonate, polymehtylpentene, (meth)acrylonitrile, polyethersulfone, polysulfone, polyetherketone and the like may also be used.

Among them, a film of the transparent resin is more preferred because the film of the transparent resin can permit continuous coating, can provide a flexible antiglare film which is highly compatible with various applications. The film thickness of the transparent resin is generally 25 to 100 $\mu$m.

As described above, when the substrate to be coated with the coating composition has a releasable surface, upon the formation of the light diffusing resin layer, the substrate may be separated from the light diffusing resin layer to provide a self-supporting light diffusing resin layer not having any substrate. In some cases, the substrate inherently has poor adhesion to the light diffusing resin layer due to the relationship between the material for the substrate and the material for the light diffusing resin layer. In this case, there is no need to intentionally render the surface of the substrate releasable. Alternatively, when the formation of the self-supporting light diffusing resin layer is contemplated, a method may also be used wherein the coating composition is coated onto a specular surface of a metal or the like to form a layer followed by the separation of the layer from the specular surface or the like.

The coating composition may be coated onto the substrate by a conventional coating or printing method. Examples of coating and printing methods include: coating methods, such as roll coating, gravure roll coating, spray coating, curtain flow coating, flow coating, kiss coating, roll coating using a spinner-whirler or the like, and brush coating; and printing methods, such as gravure printing and silk screen printing.

When drying is carried out after coating onto the substrate, concaves and convexes are formed on the surface of the coating as the drying proceeds.

As soon as the coating composition is coated onto the substrate by the coating or printing method, drying is initiated. To this end, it is common practice to perform blowing of air and/or heating. Under these conditions, the solvent is gradually evaporated.

As the amount of the solvent contained in the coating composition constituting the wet coating decreases, the light-transparent resin, present near the surface, which has been in the state of dissolution owing to the action of the good solvent, begins to gel due to the presence of the poor solvent. This leads to the formation of a solid comprised of the light-transparent resin and the light-transparent fine particles around the surface of the coating. In the gelation, the higher the evaporation rate of the good solvent as compared with the poor solvent, the higher the drying temperature, or the larger the flow of air blown, the higher the rapidity in reduction of the solvent and the higher the rapidity in the formation of the solid comprised of the light-transparent resin and the light-transparent fine particles which result in the formation of relatively large concaves and convexes. On the other hand, when the evaporation rate of the good solvent is not very higher than that of the poor solvent or when drying conditions are milder, the speed of reduction in the solvent contained in the coating composition is lower. In this case, relatively fine concaves and convexes are formed.

Further, the smaller the amount of the good solvent contained in the coating composition, the higher the rapicity in gelation. In this case, relatively large concaves and convexes are formed.

That is, according to the production process of the present invention, the size of concaves and convexes formed on the surface of the coating can be regulated by regulating the difference in evaporation rate between the good solvent and the poor solvent, drying conditions, and the proportion of the good solvent in the solvent. Since the concaves and convexes on the surface of the coating are not governed by the size of the light-transparent fine particles, different size levels of concaves and convexes can be advantageously formed even when light-transparent fine particles having the same size are used.

While retaining the concaves and convexes formed on the surface of the coating, the coating can be solidified by continuing the drying, or cured by a suitable method according to the resin component in the coating composition used. Specifically, in the case of a thermosetting resin, if necessary, heat is further applied, and, in the case of an ionizing radiation-curable resin, an ionizing radiation is applied to perform curing through crosslinking.

EXAMPLES

Example 1

The following materials were thoroughly mixed together according to the following formulation to prepare a coating composition for a light diffusing resin layer.

| | |
|---|---|
| Light-transparent resin | 100 pts. wt. |
| Pertaerythritol triacrylate | |
| (PET 30, manufactured by Nippon Kayaku Co., Ltd.) | |
| Photoinitiator | 5 pts. wt. |
| (Irgacure 184, manufactured by CIBA-GEIGY Ltd.) | |
| Light-transparent fine particles | 8 pts. wt. |
| Polystyrene resin filler | |
| (particle diameter 1.3 $\mu$m, refractive index 1.6) | |
| Good solvent | 60 pts. wt. |
| Methyl isobutyl ketone | |
| (relative evaporation rate R 1.6) | |
| Poor solvent | 15 pts. wt. |
| Isobutyl alcohol | |
| (relative evaporation rate R 0.64) | |

A cellulose triacetate film (TD-80U, thickness 80 $\mu$m, manufactured by Fuji Photo Film Co., Ltd.) was provided as a substrate. The coating composition prepared above was roll coated onto one side of the substrate. The coating was then dried at a temperature of 50° C. to form concaves and convexes on the surface of the coating, followed by application of ultraviolet light at 120 mJ to cure the coating. Thus, an antiglare film was prepared.

Examples 2 to 7 and Comparative Examples 1 to 5

For Examples 2 to 7 and Comparative Examples 1 to 4, in the coating composition used, the light transparent resin and photoinitiator used and amounts thereof were the same as used in Example 1, and the light transparent fine particles and the solvent were varied. The other conditions were the same as those used in Example 1, except that the layer thickness and the drying temperature were varied.

For Comparative Example 5, only pentaerythritol triacrylate was coated onto an embossing film having concaves and convexes on its surface to a thickness of 3 μm to form a coating which was then cured and separated.

The difference between Example 1 and the other examples and the comparative examples and the like are shown in Tables 1 and 2 below.

The antiglare films prepared in the examples and the comparative examples were evaluated, and the results are shown in Tables 3 and 4.

In Tables 3 and 4, the "scintillation" was determined by putting a color filter (staggered grid arrangement or triangular arrangement, pitch 150 μm; in order to avoid the influence of color, the color filter consists of black matrix only and the filter on each pixel is not colored) on a backlight for a liquid crystal display (LIGHTBOX 45, manufactured by HAKUBA) and fixing the antiglare film to a position distant by 160 μm from the surface of the color filter in such a manner that the antiglare film on its side having concaves and convexes was on the viewer side, and inspecting the surface of the film by means of a CCD camera to determine the standard deviation of a variation in luminance.

TABLE I

| Ex. | Light transparent fine particles: Material Particle diameter/refractive index/amount in pts. wt. | Good solvent: Name R/amount in pts. wt. | Poor solvent: Name R/amount in pts. wt. | Layer thickness Drying temp. |
|---|---|---|---|---|
| Ex. 1 | Polystyrene 1.3/1.6/8 pts. wt. | Methyl isobutyl ketone 1.6/60 pts. wt. | Isobutanol 0.64/15 pts. wt. | 3 μm 50° C. |
| Ex. 2 | Same as Ex. 1 | Same as Ex. 1 | Same as Ex. 1 | 3 μm 70° C. |
| Ex. 3 | Same as Ex. 1 | Same as Ex. 1 except that the amount was changed to 52.5 pts. wt. | Same as Ex. 1 except that the amount was changed to 22.5 pts. wt. | same as Ex. 1 |
| Ex. 4 | ① Polystyrene 1.3/1.6/4 pts. wt. ② Polystyrene 1.5/1.55/4 pts. wt. | n-Butyl acetate 1.0/60 pts. wt. | Isopropanol 1.5/40 pts. wt. | 3 μm 70° C. |
| Ex. 5 | Polystyrene 3.5/1.6/12 pts. wt. | Toluene 2.0/40 pts. wt. | Ethanol 1.54/35 pts. wt. | 5 μm 80° C. |
| Ex. 6 | Polystyrene 5/1.6/8 pts. wt. | Cyclohexanone 0.32/65 pts. wt. | Isopropanol 1.5/35 pts. wt. | 8 μm 60° C. |
| Ex. 7 | Polystyrene 4/1.6/9 pts. wt. | Xylene 0.76/40 pts. wt. | n-Butanol 0.47/35 pts. wt. | 8 μm 100° C. |

TABLE 2

| Comp. Ex. | Light transparent fine particles: Material Particle diameter/refractive index/amount in pts. wt. | Good solvent: Name R/amount in pts. wt. | Poor solvent: Name R/amount in pts. wt. | Layer thickness Drying temp. |
|---|---|---|---|---|
| Comp. Ex. 1 | Same as Ex. 1 | Methyl isobutyl ketone 1.6/75 pts. wt. | | 3 μm 70° C. |
| Comp. Ex. 2 | Same as Ex. 1 | Isobutanol 0.64/75 pts. wt. | | 3 μm 70° C. |
| Comp. Ex. 3 | ① Agglomerative silica 1/2/1.45/3 pts. wt. ② Agglomerative silica 1.7/1.45/3 pts. wt. | Toluene 2.0/75 pts. wt. | | 3 μm 70° C. |
| Comp. Ex. 4 | Agglomerative silica 1.7/1.45/6 pts. wt. | Isobutanol 0.64/75 pts. wt. | | 3 μm 70° C. |
| Comp. Ex. 5 | | | | 3 μm 50° C. |

TABLE 3

| Item | Ex. 1 | Ex. 2 | Ex. 3 | Ex. 4 | Ex. 5 | Ex. 6 | Ex. 7 |
|---|---|---|---|---|---|---|---|
| Transmittance | 91.2 | 91 | 91.2 | 91.5 | 91 | 91.4 | 91 |
| Haze | 13.3 | 15 | 19.3 | 8.6 | 24.7 | 14 | 16 |
| Internal haze | 5 | 5 | 5 | 3.5 | 9 | 6 | 6.5 |
| Scintillation | 10 | 12 | 13 | 14 | 9 | 12 | 11 |
| Sharpness | 124 | 100 | 80 | 139 | 157 | 95 | 107 |
| External light reflection preventive properties | 60 | 53 | 26 | 56 | 36 | 45 | 51 |
| Ra | 0.174 | 0.185 | 0.197 | 0.167 | 0.186 | 0.230 | 0.191 |
| θa | 2.33 | 2.15 | 2.68 | 2.04 | 3.45 | 2.24 | 2.09 |
| Rz | 1.19 | 1.67 | 2.21 | 1.76 | 2.19 | 2.78 | 1.97 |
| Rmax | 1.31 | 2.14 | 3.14 | 1.83 | 2.31 | 2.93 | 2.46 |
| Sm | 40.0 | 52.6 | 50.8 | 47.6 | 48.8 | 40 | 55 |

Sharpness: Sharpness of transmitted image. The larger the value, the better the sharpness.
External light reflection preventive properties: The smaller the value, the better the properties.
Transmittance: Total light transmittance.

TABLE 4

| Item | Comp. Ex. 1 | Comp. Ex. 2 | Comp. Ex. 3 | Comp. Ex. 4 | Comp. Ex. 5 |
|---|---|---|---|---|---|
| Transmittance | 91.7 | 89 | 91.2 | 90.6 | 92.3 |
| Haze | 17 | 45 | 11 | 21 | 4.5 |
| Internal haze | 15 | 3 | 0.3 | 0.3 | 0 |
| Scintillation | 9 | 14 | 19 | 14 | 41 |
| Sharpness | 325 | 15.9 | 40 | 32 | 276 |
| External light reflection preventive properties | 87 | 3.5 | 45 | 19 | 80 |
| Ra | 0.105 | 1.40 | 0.328 | 0.365 | 0.111 |
| θa | 0.94 | 5.11 | 2.20 | 3.44 | 1.1 |
| Rz | 0.38 | 7.72 | 2.93 | 3.01 | 0.64 |
| Rmax | 0.41 | 11.5 | 3.16 | 3.53 | 0.75 |
| Sm | 131 | 118 | 42.1 | 53.7 | 89.3 |

Sharpness: Sharpness of transmitted image. The larger the value, the better the sharpness.
External light reflection preventive properties: The smaller the value, the better the properties.
Transmittance: Total light transmittance.

Example 1 is different from Example 2 only in drying temperature. The antiglare film of Example 1 using a lower drying temperature, as compared with the antiglare film of Example 2, had finer concaves and convenes and, by virtue of this, possessed better scintillation and sharpness of transmitted image (the sharpness of transmitted image being hereinafter and in tables referred to simply as "sharpness"). The antiglare film of Example 2 using a higher drying temperature, as compared with the antiglare film of Example 1, had higher surface roughness. Due to the higher surface roughness, the level of external light reflection preventive properties was better although the sharpness was lower and the haze was somewhat higher.

In Example 3, the proportion of the poor solvent was higher than that in Example 1. Due to the higher proportion of the poor solvent, despite the fact that the crying temperature in Example 3 was the same as that in Example 1, the surface roughness was higher than that in the case of Example 2 using a higher drying temperature than Example 1. Therefore, the level of external light reflection preventive properties was further improved, although the sharpness was lower and the haze was higher.

In Example 4, 50% of the fine particles used was accounted for by fine particles having a refractive index of 1.5 which was close to the refractive index of the resin. Due to the lower haze, the sharpness was somewhat higher. Although the level of scintillation was inferior to that in Example 1 due to lower internal haze, this level of scintillation was satisfactory from the practical point of view.

In Examples 5 to 7 wherein the diameter of fine particles and the solvent were varied, the properties of the antiglare films were as good as those in Example 1 and other examples.

In Comparative Example 1 wherein the solvent consisted of the good solvent alone, concaves and convexes were less likely to be formed on the surface and, consequently, the surface was substantially flat. This provided inferior external light reflection preventive properties, although the scintillation and the sharpness were good.

In Comparative Example 2 wherein the solvent consisted of the poor solvent alone, considerably large concaves and convexes were formed to constitute a frosted glass-like surface. This results in lowered light transmittance and very low sharpness.

In Comparative Example 3, the sharpness was poor although the scintillation and the external light reflection preventive properties were good.

In Comparative Example 5 wherein, unlike the examples and the other comparative examples, an embossing film was used to form concaves and convexes and the fine particles were not added, the absence of the fine particles provided good transmittance and sharpness. However, the scintillation and the level of the external light reflector preventive properties were not satisfactory.

According to the present invention wherein the light-transparent resin and the light-transparent fine particles in a resin layer and the surface roughness of the resin layer were specified, an antiglare film having such a resin layer possesses excellent properties, that is, possesses a high level of anti-scintillation properties, a high level of sharpness of transmitted images, and high light transmittance (=total light transmittance) while enjoying a high level of external light reflection preventive properties.

According to a preferred embodiment of the present invention, the antiglare film is provided with a transparent substrate. This construction can advantageously offer good strength and good handleability at the time of production and fabrication.

According to the present invention, unlike the prior art, the thickness of the resin coating is larger than the diameter of the fine particles. Therefore, the antiglare film is durable.

Further, according to the present invention, sharp images can be provided on a display using this antiglare film, and the visibility of images is satisfactory even under an environment exposed to external light or under illumination. Further, according to a preferred embodiment of the present invention, the resin layer is formed of a crosslinking-cured product of an ionizing radiation-curable resin composition. The antiglare film having this resin layer possesses excellent physical and chemical properties.

According to the production process of the present invention, an antiglare film having desired concaves and convexes can be produced by properly selecting good and poor solvents, mixing ration, drying temperature and other conditions, without necessarily limiting the diameter of fine particles to be incorporated.

Further, according to a preferred embodiment of the present invention, a solvent may be selected from highly general-purpose solvents to produce the antiglare film.

According to the production process of the present invention, an antiglare film having excellent physical and chemical properties can be stably produced by forming concaves and convexes using an ionizing radiation-curable resin and applying an ionizing radiation to the coating to cure the coating through crosslinking.

What is claimed is:

1. An antiglare film comprising a light diffusing resin layer formed of non-agglomerative light-transparent fine particles dispersed in a light-transparent resin, the light-transparent fine particles having a particle diameter of 1.0 to 5.0 $\mu$m, the difference in optical refractive index between the light-transparent fine particles and the light-transparent resin being 0.05 to 0.15, the content of the light-transparent fine particles being 5 to 30 parts by weight based on 100 parts by weight of the light-transparent resin, the surface roughness of the light diffusing resin layer being 0.12 to 0.30 in terms of center line average roughness (Ra) and 1.0 to 2.9 in terms of ten-point average roughness (Rz), wherein the thickness of the light diffusing resin layer is 1 to 3 times the diameter of the light-transparent fine particles.

2. The antiglare film according to claim 1, wherein the light diffusing resin layer is formed on a transparent substrate.

3. The antiglare film according to claim 1, which has an image sharpness of 80 to 300 and a level of external light reflection preventive properties of 5 to 70.

4. The antiglare film according to claim 1, wherein the light-transparent resin is a cured product of an ionizing radiation-curable resin.

* * * * *